United States Patent
Aritomi

(10) Patent No.: US 7,693,968 B2
(45) Date of Patent: Apr. 6, 2010

(54) PRINTING SYSTEM, INFORMATION PROCESSING APPARATUS, INSTALLATION METHOD, AND PROGRAM FOR IMPLEMENTING THE METHOD

(75) Inventor: Masanori Aritomi, Tokyo (JP)

(73) Assignee: Canon Kabushiki Kaisha (JP)

( * ) Notice: Subject to any disclaimer, the term of this patent is extended or adjusted under 35 U.S.C. 154(b) by 1143 days.

(21) Appl. No.: 10/886,270

(22) Filed: Jul. 7, 2004

(65) Prior Publication Data

US 2005/0044200 A1 Feb. 24, 2005

(30) Foreign Application Priority Data

Jul. 8, 2003 (JP) ............... 2003-193621

(51) Int. Cl.
- G06F 15/177 (2006.01)
- G06F 15/16 (2006.01)
- G06G 15/173 (2006.01)

(52) U.S. Cl. ............ 709/221; 709/203; 709/220; 709/223

(58) Field of Classification Search ......... 709/220, 709/221, 223, 224, 203
See application file for complete search history.

(56) References Cited

U.S. PATENT DOCUMENTS

| | | | |
|---|---|---|---|
| 6,643,650 B1 * | 11/2003 | Slaughter et al. | 707/10 |
| 7,084,994 B1 * | 8/2006 | Koppich et al. | 358/1.15 |
| 7,171,442 B1 * | 1/2007 | Huang | 709/203 |
| 7,286,252 B2 * | 10/2007 | Kawabuchi et al. | 358/1.15 |
| 7,433,070 B2 * | 10/2008 | Koppich et al. | 358/1.15 |
| 2002/0002614 A1 * | 1/2002 | Murphy et al. | 709/226 |
| 2002/0019859 A1 * | 2/2002 | Watanabe | 709/219 |
| 2002/0097421 A1 | 7/2002 | Lomas et al. | |
| 2002/0110397 A1 * | 8/2002 | Bussell | 400/104 |
| 2002/0122199 A1 | 9/2002 | Lomas et al. | |
| 2002/0138564 A1 * | 9/2002 | Treptow et al. | 709/203 |
| 2003/0048473 A1 * | 3/2003 | Rosen | 358/1.15 |
| 2003/0065755 A1 * | 4/2003 | Gunji | 709/221 |
| 2003/0084132 A1 | 5/2003 | Ohta | |
| 2003/0135549 A1 * | 7/2003 | Kuno et al. | 709/203 |
| 2006/0259549 A1 * | 11/2006 | Huang | 709/203 |

FOREIGN PATENT DOCUMENTS

| | | | |
|---|---|---|---|
| JP | 10-105349 | A | 4/1998 |
| JP | 2000-215128 | A | 8/2000 |
| JP | 2001-230892 | A | 8/2001 |
| JP | 2002-149363 | A | 5/2002 |
| JP | 2003-131839 | A | 5/2003 |
| JP | 2003-140852 | A | 5/2003 |
| JP | 2004-213132 | A | 7/2004 |

* cited by examiner

*Primary Examiner*—Saleh Najjar
*Assistant Examiner*—Edward J Kim
(74) *Attorney, Agent, or Firm*—Rossi, Kimms & McDowell LLP

(57) ABSTRACT

A printing system which allow an administrator to change the settings of client apparatuses concerning the apparatus configuration of a printer, on his/her own initiative. Apparatus configuration information on the printer is acquired from the printer by a server apparatus via the network. The acquired apparatus configuration information on the printer is coupled to driver data, and the driver data having the apparatus configuration information on the printer coupled thereto is installed in the client apparatuses in response to an installation instruction from a user without waiting for an installation request to be received from any of the client apparatuses via the network.

14 Claims, 12 Drawing Sheets

PRINTING SYSTEM, INFORMATION PROCESSING APPARATUS, INSTALLATION METHOD, AND PROGRAM FOR IMPLEMENTING THE METHOD

CROSS REFERENCE TO RELATED APPLICATION

This application claims priority from Japanese Patent Application No. 2003-193621 filed Jul. 8, 2003, which is hereby incorporated by reference.

BACKGROUND OF THE INVENTION

1. Field of the Invention

The present invention relates to a printing system which is constructed on a network including a server apparatus, client apparatuses, and printers usable by the client apparatuses, an information processing apparatus for use in the printing system, an installation method for the printing system, and an installation program for implementing the method.

2. Description of the Related Art

Methods of installing a printer driver include an OS-dependent type. In the case of an OS-dependent method which is dependent e.g. on Windows (registered trademark), a user selects addition of a printer from a window of the properties of a printer, and then inputs necessary information through an interactive user guide called Wizard, to thereby install a printer driver. With a view to minimizing user operation, there is also conventionally employed a method using an installer, similarly to the case of installing an application program.

However, when either of the above-mentioned installation methods is employed in an environment where numerous client apparatuses are used by numerous users, such as company users, it becomes necessary to carry out the operation of installing printer drivers in all of the client apparatuses, and therefore the total number of man-hours needed for the operation cannot be neglected from an economical point of view. Further, the installation of a printer driver in a client apparatus requires a predetermined skill level or higher. Therefore, it becomes necessary to prepare a detailed manual for the installing operation, or provide tutorials for all the users of the client apparatuses. In the worst case, a network administrator has to carry out an enormous amount of work for installing a printer driver in each of the client apparatuses. In short, the number of man-hours needed for the installing operation increases with an increase in the number of the client apparatuses.

As a method capable of minimizing the number of man-hours needed for installation of printer drivers, there has been proposed a method called Point & Print installation, which uses a print server, e.g. in Japanese Laid-Open Patent Publication (Kokai) No. 2003-140852. More specifically, this method is based on a capability of a Widows-NT or Windows-2000 server apparatus to automatically distribute a print driver to client apparatuses, and is capable of installing the printer driver in all the client apparatuses by the automatic distribution.

When a printer that can be equipped with an optional device or the like has its apparatus configuration changed by mounting of the optional device therein, it is necessary to change the settings of each client apparatus concerning the apparatus configuration of the printer so as to cause the change in the apparatus configuration of the printer to be reflected in the client apparatus. However, in the Point & Print installation method using a print server, the server apparatus (administrator) cannot change the settings of the client apparatuses (users) concerning the apparatus configuration of the printer, on its (his/her) own initiative.

SUMMARY OF THE INVENTION

It is an object of the present invention to provide a printing system, an information processing apparatus, and an installation method, which allow an administrator to change the settings of client apparatuses concerning the apparatus configuration of a printer, on his/her own initiative, and an installation program for implementing the method.

To attain the above object, in a first aspect of the present invention, there is provided a printing system comprising a server apparatus, at least one client apparatus, at least one printer available to the client apparatus, and a network interconnecting the server apparatus, the client apparatus, and the printer, wherein the server apparatus comprises a storage device that stores at least one driver program corresponding to the printer, an acquisition device that acquires apparatus configuration information on the printer from the printer via the network, a management device that manages the acquired apparatus configuration information on the printer such that the driver program corresponding to the printer can be read out, a coupling device that couples the driver program corresponding to the printer to the apparatus configuration information on the printer when the driver program is read out, and an installation processing device that is responsive to an installation instruction from a user, for controlling a process for installing the driver program together with the apparatus configuration information on the printer coupled thereto, in the client apparatus without waiting for an installation request to be received from the client apparatus via the network.

With the arrangement of the printing system according to the first aspect of the present invention, the administrator can change the settings of client apparatuses concerning the apparatus configuration of the printer, on his/her own initiative.

To attain the above object, in a second aspect of the present invention, there is provided an information processing apparatus connected, via a network, to at least one client apparatus and at least one printer available to the client apparatus, the information processing apparatus cooperating with the client apparatus and the printer to construct a printing system on the network, comprising a storage device that stores at least one driver program corresponding to the printer, an acquisition device that acquires apparatus configuration information on the printer from the printer via the network, a management device that manages the acquired apparatus configuration information on the printer such that the driver program corresponding to the printer can be read out, a coupling device that couples the driver program corresponding to the printer to the apparatus configuration information on the printer when the driver program is read out, and an installation processing device that is responsive to an installation from a user, for controlling a process for installing the driver program together with the apparatus configuration information on the printer coupled thereto in the client apparatus, without waiting for an installation request to be received from the client apparatus via the network.

Preferably, the apparatus configuration information on the printer includes an apparatus name, a generation time of the apparatus configuration information, and option information indicative of presence or absence of at least one optional device.

Preferably, the information processing apparatus further comprises an additional condition-setting device that sets additional conditions for limiting capability of each of the at least one printer by an input operation, a filter generating device that generates a filter corresponding to the set additional conditions, a filter installing device that installs the generated filter on a printer capability notification path for informing the client apparatus of the capability of the printer, and a second coupling device that couples the additional conditions to the driver program corresponding to the printer having the apparatus configuration information on the printer coupled thereto when the additional conditions have been set, and the driver program corresponding to the printer having the set additional conditions and the apparatus configuration information on the printer coupled thereto is installed in the client apparatus by the installation processing device via the network.

Preferably, the additional conditions includes a condition for limiting authority of a user who uses the printer.

Preferably, the information processing apparatus comprises a second storage device that stores information on the capability of the printer, and wherein the printer capability notification path connects the client apparatus and the second storage device.

Preferably, the management device manages the acquired apparatus configuration information on the printer in a state coupled to the driver program corresponding to the printer.

To attain the above object, in a third aspect of the present invention, there is provided a method of installing in at least one client apparatus, on a network accommodating a server apparatus, the at least one client apparatus, and at least one printer available to the client apparatus, a driver corresponding to each of the at least one printer from the server apparatus, comprising an acquisition step of acquiring apparatus configuration information on the printer from the printer via the network, a management step of managing the acquired apparatus configuration information on the printer such that the driver program corresponding to the printer can be read out, a coupling step of coupling the driver program corresponding to the printer to the apparatus configuration information on the printer when the driver program is read out, and an installation processing step of controlling a process for installing the driver program together with the apparatus configuration information on the printer coupled thereto, in the client apparatus, in response to an installation instruction from a user, without waiting for an installation request to be received from the client apparatus via the network.

Preferably, the apparatus configuration information on the at lest one printer includes an apparatus name, a generation time of the apparatus configuration information, and option information indicative of presence or absence of at least one optional device.

Preferably, the method further comprises an additional condition-setting step of setting additional conditions for limiting capability of each of the printer by an input operation, a filter generating step of generating a filter corresponding to the set additional conditions, and a filter installing step of installing the generated filter on printer capability notification paths for informing the client apparatus of the capability of the printer, and a second coupling step of coupling the additional conditions to the driver program corresponding to the printer having the apparatus configuration information on the printer coupled thereto when the additional conditions have been set, wherein the driver program corresponding to the printer having the set additional conditions and the apparatus configuration information on the printer coupled thereto is installed in the client apparatus in the installation processing step via the network.

Preferably, the additional conditions includes a condition for limiting authority of a user who uses the printer.

Preferably, the server apparatus includes a second storage device that stores information on the capability of the printer, and wherein the printer capability notification path connects the client apparatus and the second storage device.

Preferably, in the management step, the acquired apparatus configuration information on the printer is managed in a state coupled to the driver program corresponding to the printer.

To attain the above object, in a fourth aspect of the present invention, there is provided a program for executing a method of installing in at least one client apparatus, on a network accommodating a server apparatus, the at least one client apparatus, and at least one printer available to the client apparatus, a driver corresponding to each of the at least one printer from the server apparatus, comprising an acquisition module for acquiring apparatus configuration information on the printer from the printer via the network, a management module for managing the acquired apparatus configuration information on the printer such that the driver program corresponding to the printer can be read out, a coupling module coupling the driver program corresponding to the printer to the apparatus configuration information on the printer when the driver program is read out, and an installation processing module for controlling a process for installing the driver program together with the apparatus configuration information on the printer coupled thereto, in the client apparatus, in response to an installation instruction from a user, without waiting for an installation request to be received from the client apparatus via the network.

The above and other objects, features and advantages of the invention will become more apparent from the following drawings taken in conjunction with the accompanying drawings.

DETAILED DESCRIPTION OF THE PREFERRED EMBODIMENTS

The present invention will now be described in detail with reference to the drawings showing a preferred embodiment thereof.

Figure 1:
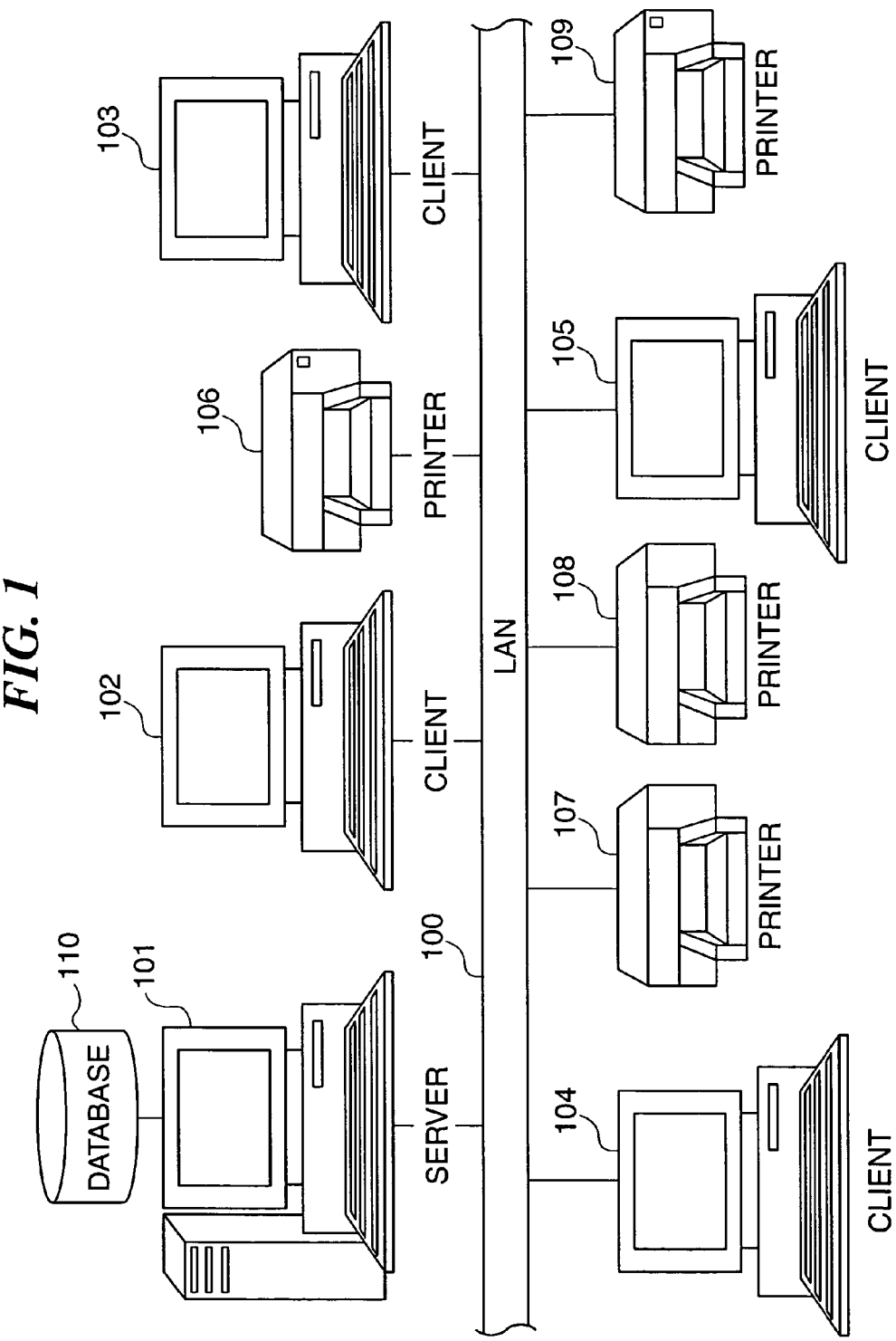
FIG. 1 is a block diagram showing the arrangement of a printing system according to an embodiment of the present invention.

FIG. 1 is a block diagram showing the arrangement of a printing system according to an embodiment of the present invention.

As shown in FIG. 1, the printing system according to the present embodiment is constructed on a system in which a server 101, a plurality of clients 102, 103, 104, and 105, and a plurality of printers 106, 107, 108, and 109 are interconnected via a LAN (Local Area Network) 100. The server 101 is connected to a database 110, and is capable of installing printer drivers in each of the client 102, 103, 104, and 105 via the LAN 100. This function is so-called "push installation", which will be described in detail hereinafter.

Figure 2:
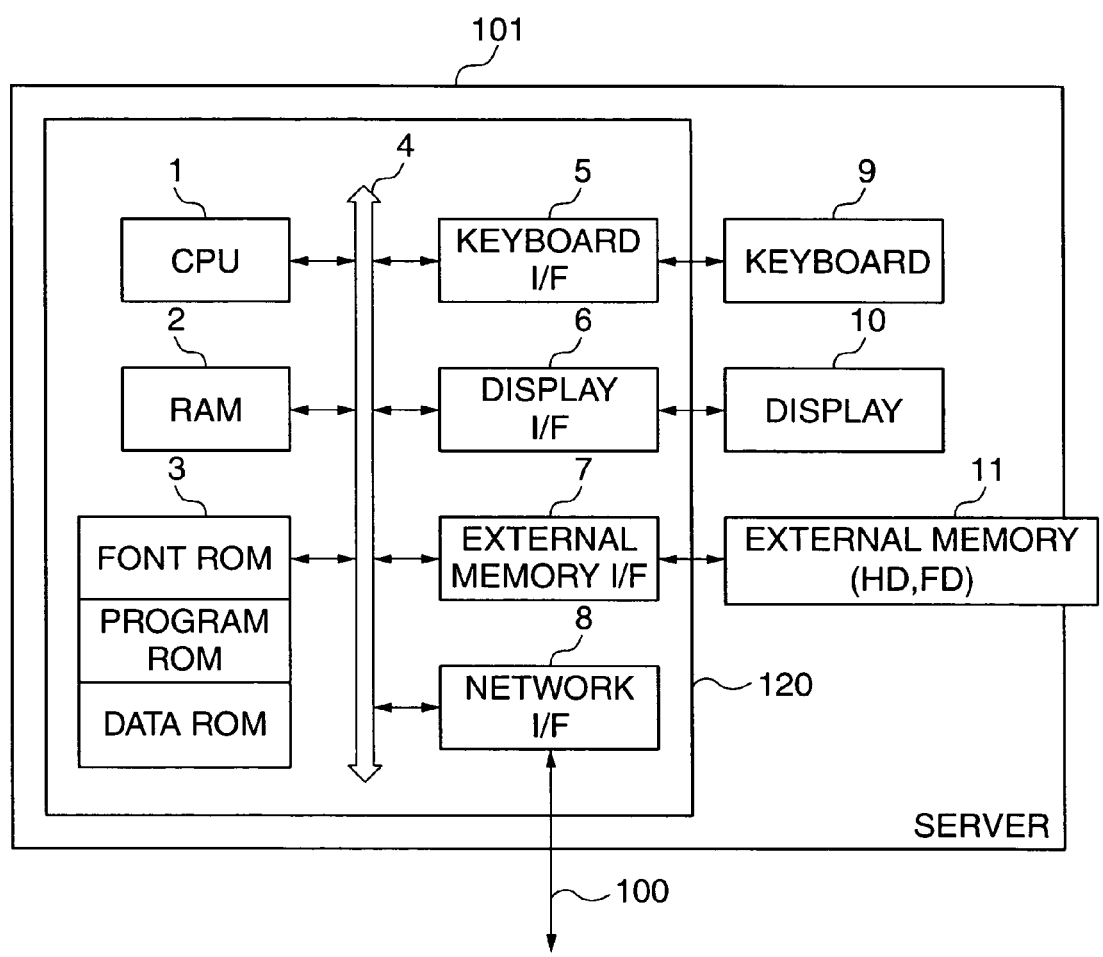
FIG. 2 is a block diagram showing the arrangement of a server appearing in FIG. 1.

Next, a description will be given of the arrangement of the server 101, with reference to FIG. 2. FIG. 2 is a block diagram showing the arrangement of the server 101 in FIG. 1.

As shown in FIG. 2, the server 101 includes a main unit 120. The main unit 120 incorporates a CPU 1 that starts an OS (Operating System) stored in a program ROM of a ROM 3 or in an external memory 11 and executes various processes on the OS. The CPU 1 performs centralized overall control of various devices connected to a system bus 4.

For example, the CPU 1 processes documents, including ones containing graphics, images, text, and tables (including spreadsheets) in a mixed manner, based on a document processing program stored in the program ROM of the ROM 3 or in the external memory 11. The CPU 1 uses a RAM 2 as a work area for carrying out various processes.

The ROM 3 includes not only the program ROM, but also a font ROM and a data ROM. The font ROM stores font data for use in the above-mentioned processing of documents (hereinafter referred to as the "document processing") and the like. Similar font data can also be stored in the external memory 11. The data ROM stores data for use in the document processing or the like.

The devices connected to the system bus 4 include a keyboard I/F 5, a display I/F 6, an external memory I/F 7, and a network I/F 8.

The keyboard I/F 5 controls inputs from the keyboard 9 and a pointing device (not shown), such as a mouse. The display I/F 6 controls the display of a display 10 implemented by a liquid crystal display device or a CRT. The external memory I/F 7 controls access to the external memory 11.

The external memory 11 includes a hard disk (HD) and a floppy (registered trademark) disk (FD) storing various application programs, font data, user files, edit files, printer drivers, and so forth.

The network I/F 8 is connected to the LAN 100, and performs control of communication with the clients 102, 103, 104, and 105, and the printers 106, 107, 108, and 109.

The CPU 1 rasterizes outline fonts onto a display information RAM provided e.g. on the RAM 2, to enable WYSIWYG (What You See Is What You Get) on the display 10. Also, the CPU 1 opens various registered windows in response to commands e.g. by a mouse cursor or the like (not shown) on the display 10, and executes various data processes.

The clients 102 to 105 are similar in arrangement to the server 101 described above, and therefore description thereof is omitted.

Figure 3:
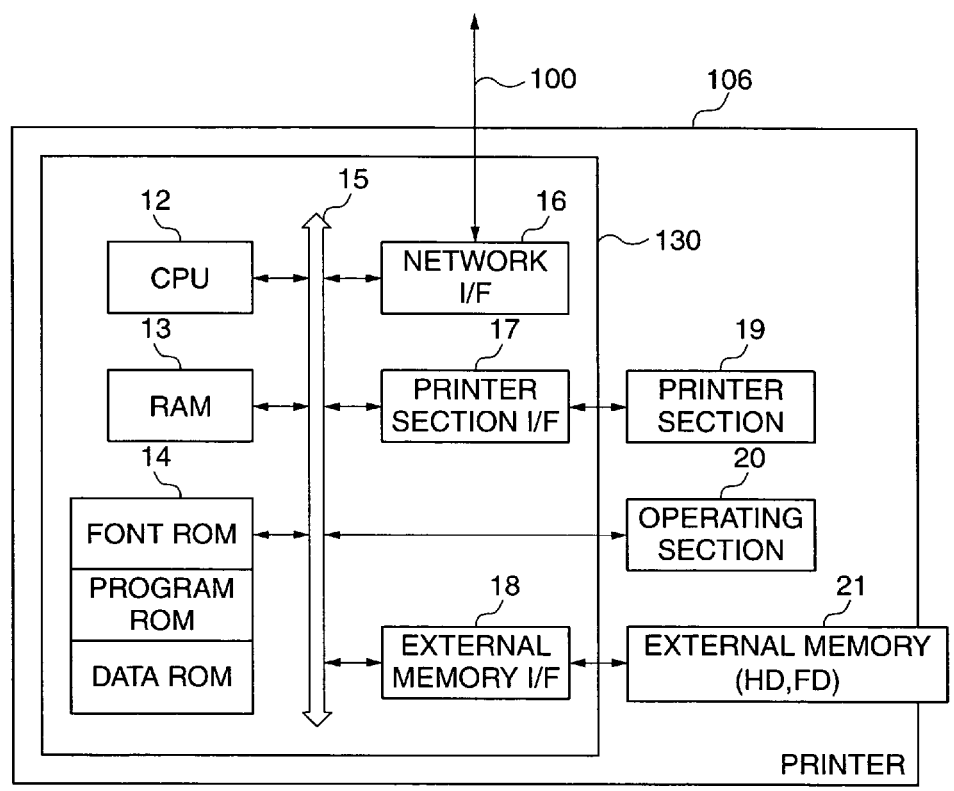
FIG. 3 is a block diagram showing the arrangement of a printer appearing in FIG. 1.

Next, a description will be given of the arrangement of each of the printers 106 to 109, with reference to FIG. 3. FIG. 3 is a block diagram showing the arrangement of the printer 106 in FIG. 1. The printers 106 to 109 are identical in arrangement, and therefore the following description will be given of the arrangement of the printer 106 as a representative.

As shown in FIG. 3, the printer 106 includes a controller 130 that controls the operation of the printer 106. The controller 130 is provided with a network I/F 16 for connection to the LAN 100. The network I/F 16 obtains print information, such as text, graphics, and images, outputted in printer language forms, from the clients 102 to 105 via the LAN 100. The obtained print information is supplied to a CPU 12 via a system bus 15.

The CPU 12 expands the print information from the clients 102 to 105 in a work area of a RAM 13, according to a control program stored in a program ROM of a ROM 14 or in an external memory 21, and sends image data as an image signal for each page, to a printer section (printer engine) 19 via the system bus 15 and the printer section I/F 17, to thereby control the printer section 17 to record the image signal on sheets on a page-by-page basis.

The ROM 14 includes not only the program ROM, but also a font ROM and a data ROM. The font ROM stores font data for use in generating the image signal, and the data ROM stores data for use by the clients 102 to 105. The data may be stored in the external memory 21.

The RAM 13 is used as an area for storing results of arithmetic operations and processing, and buffering input data, an area for storing drawing information for both sides of a recording sheet, an area for storing environment data, and an NVRAM. Further, the memory capacity of the RAM 13 can be increased by using an optional RAM connected to an add-on port (not shown), in addition to the RAM 13.

The external memory 21 is implemented by a storage device, such as a hard disk (HD) or a floppy (registered trademark) disk (FD), and access to the external memory 21 is controlled by an external memory I/F 18. The external memory 21 can also be implemented by another storage medium, such as a memory card. Further, the external memory 21 is not limited to a single memory, but may be configured to be comprised of a plurality of external memories connected to the printer 106, which store optional fonts to supplement the internal fonts, programs for interpreting printer control languages of different language systems, etc. Furthermore, the external memory 21 may be provided with an NVRAM to store printer mode setting information from an operating section 20.

Instructions to the CPU 12 are issued from the operating section 20. The operating section 20 includes keys for use in setting various modes, an LED display, and so forth.

Figure 4:
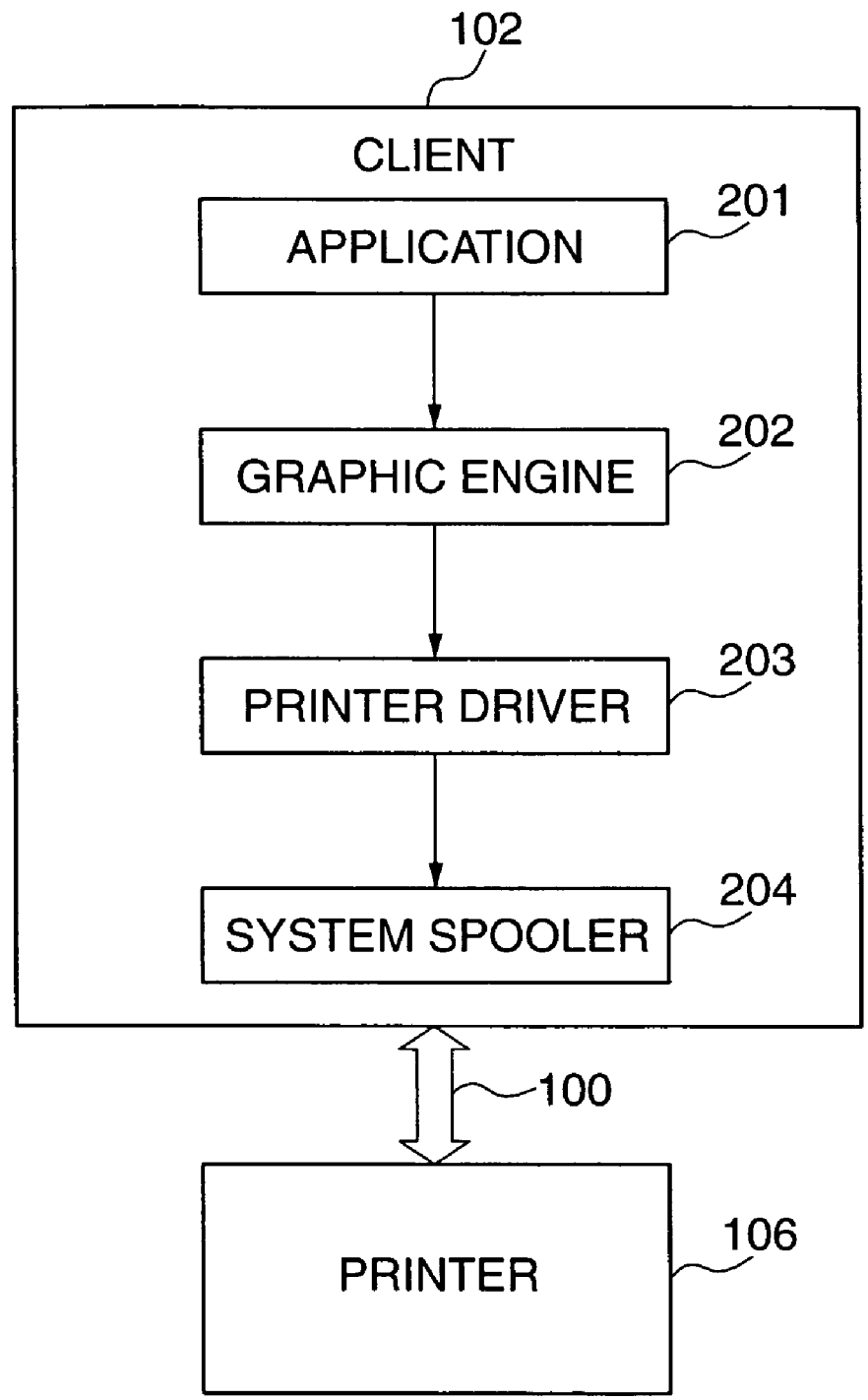
FIG. 4 is a block diagram showing the software configuration of a client appearing in FIG. 1.

Next, a description will be given of the software configuration of the clients 102 to 105, with reference to FIG. 4. FIG. 4 is a block diagram showing the software configuration of the client 102 in FIG. 1. The clients 102 to 105 are identical in software configuration, and therefore the following description will be given of the software configuration of the client 102 as a representative.

As shown in FIG. 4, in the client 102, an application 201 stored in an external memory is loaded into a RAM and executed. When printing is carried out according to the application 201 using e.g. the printer 106, a graphic engine 202 which is enabled by being loaded into the RAM, similarly to the application 201, is used for outputting (image drawing).

The graphic engine 202 loads a printer driver 203 provided on a printer-by-printer basis into the RAM from the external memory, and converts an output from the application 201 into a control command for the printer 106 using the printer driver 203. The printer control command obtained by the conversion is sent to a system spooler 204 loaded into the RAM by the OS, followed by being outputted to the printer 106 via the LAN 100.

In the present embodiment, the server 101 has the function of carrying out push installation, as described above. According to the push installation, a printer driver is distributed from the server 101 to the clients 102 to 105 via the LAN 100, and installed thereon. The push installation includes a process executed by the server 101 for changing the settings of the clients 102 to 105 concerning the apparatus configuration of the printers 106 to 109, in accordance with a change in the apparatus configuration.

Figure 12:
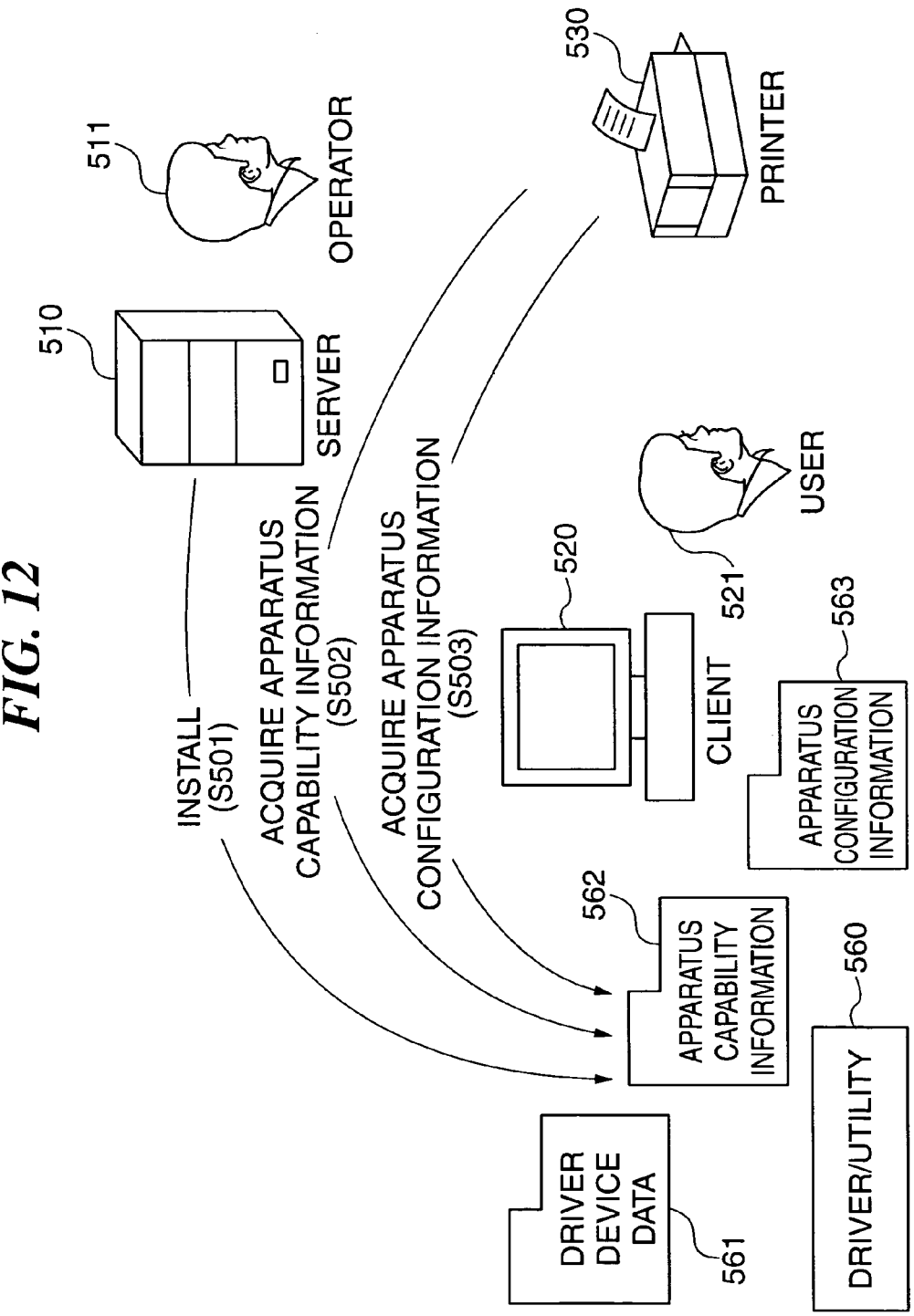
FIG. 12 is a block diagram showing a reference example of the arrangement of a system as a precondition for the present invention.

Now, a description will be given of a reference example of the system as a precondition for the present invention, with reference to FIG. 12, before describing the push installation of a printer driver in each of the clients 102 to 105 by the server 101 and the operation of changing the settings of the clients 102 to 105 concerning the apparatus configuration of the printers 106 to 109. FIG. 12 is a block diagram showing the reference example of the system as the precondition for the present invention.

In the reference example of the system, as shown in FIG. 12, a server 510, a client 520, and a printer 530 are interconnected via a network, and a driver corresponding to the printer 530 is installed in the client 520 using the push installation. More specifically, the driver corresponding to the printer 530 is installed from the server 510 in the client 520 via the network (step S501).

The driver 560 installed in the client 520 includes driver device data 561. The driver device data 561 contains conditions for limiting driver functions and device options. Further, the driver 560 has the function of automatically obtaining apparatus configuration information on the printer 530 via the network. With this function, apparatus capability acquisition (step S502) and apparatus configuration acquisition (step S503) are performed via the network. Information obtained through the apparatus capability acquisition includes information indicative of whether the printer is a color printer or a monochrome printer and information indicative of resolution of the printer, for example. Information obtained through the apparatus configuration acquisition includes information indicative of whether or not one or more optional devices, such as a double-sided printing mechanism and a staple mechanism, are provided. As a result, the driver device data 561, the apparatus capability information 562, and the apparatus configuration information 563 are inputted to the client 520. Then, the client 520 evaluates the three kinds of data with respect to each other to thereby configure settings concerning the apparatus configuration of the printer 530.

For example, when a double-sided printing mechanism is mounted in the printer 530 as an optional device, the client 520 inputs again the driver device data 561, the apparatus capability information 562, and the apparatus configuration information 563, as described above, and evaluates the three kinds of data with respect to each other to thereby configure the settings concerning the apparatus configuration of the printer 530. As a result, the user 521 using the client 520 is allowed to designate double-sided printing when using the printer 530.

It should be noted that an application executed on the client 520 generally controls output therefrom with reference to the capability of the printer 530 the information indicative of which is passed thereto from the driver 560 via the OS.

Figure 5:
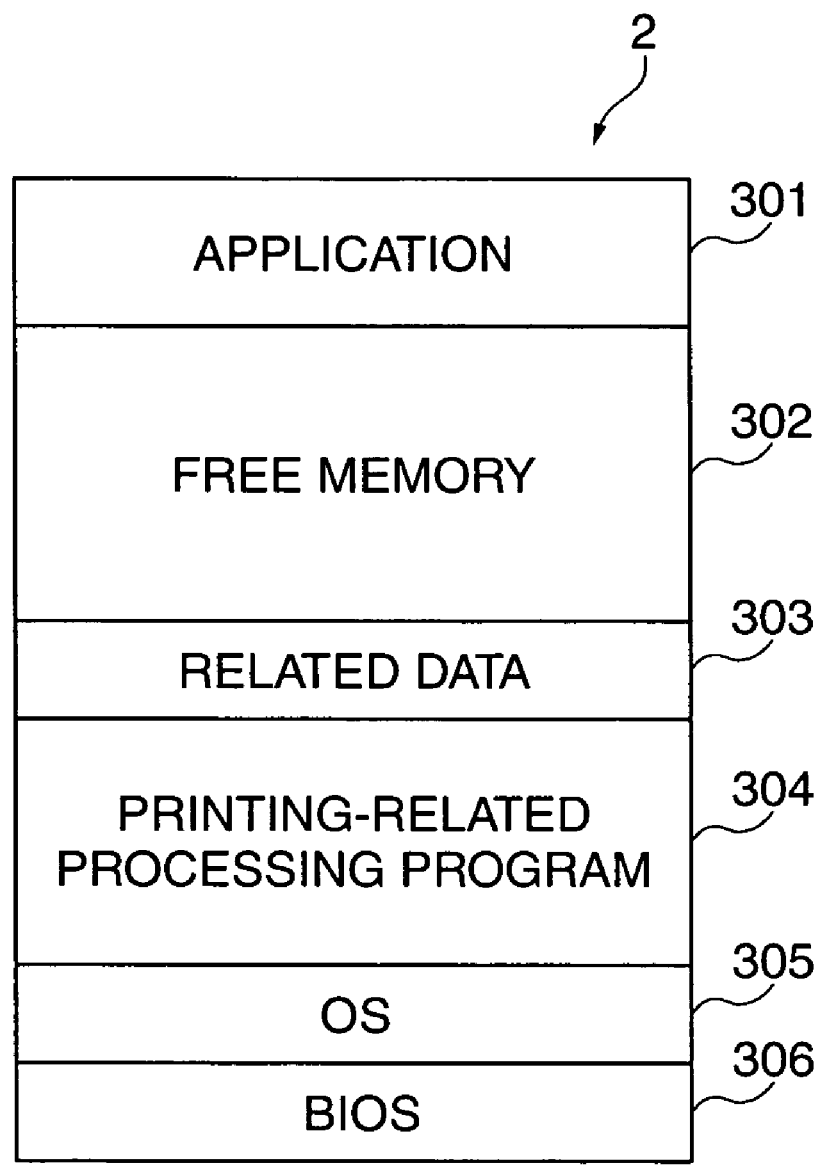
FIG. 5 is a diagram showing a memory map of a RAM on the server in FIG. 1.
Figure 6:
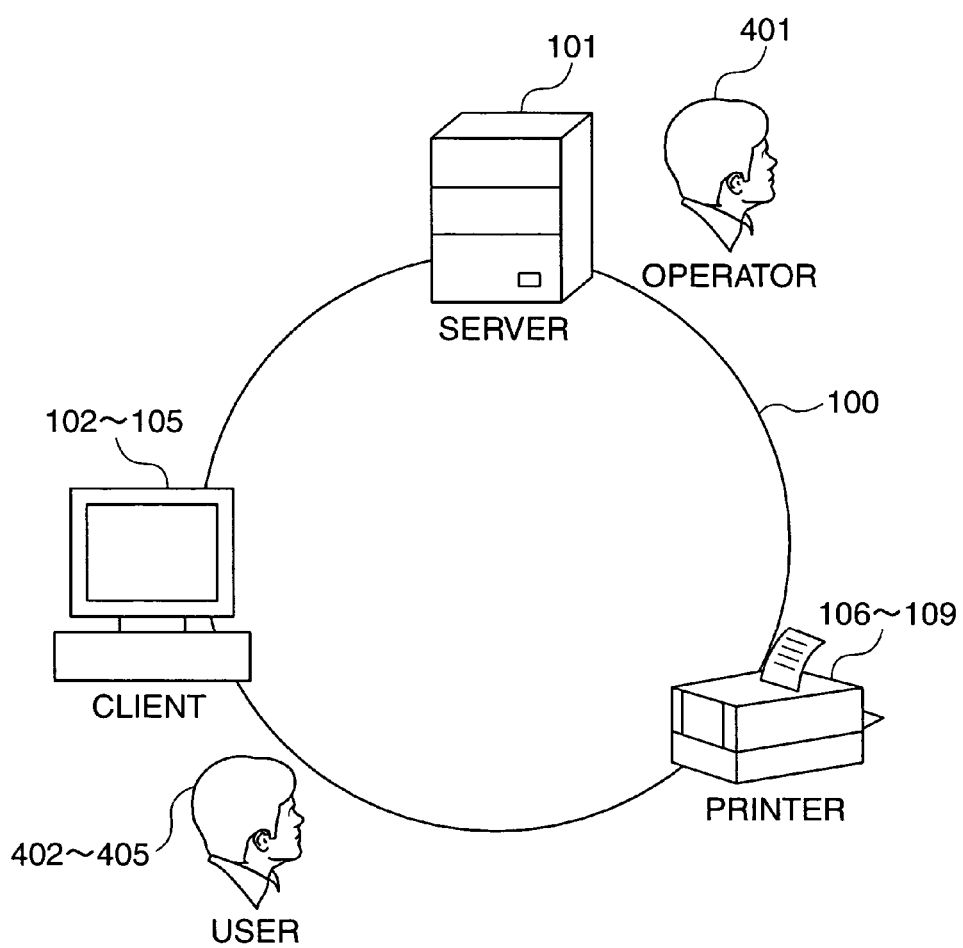
FIG. 6 is a schematic diagram showing the arrangement of a system for push installation by the server in FIG. 1.
Figure 7:
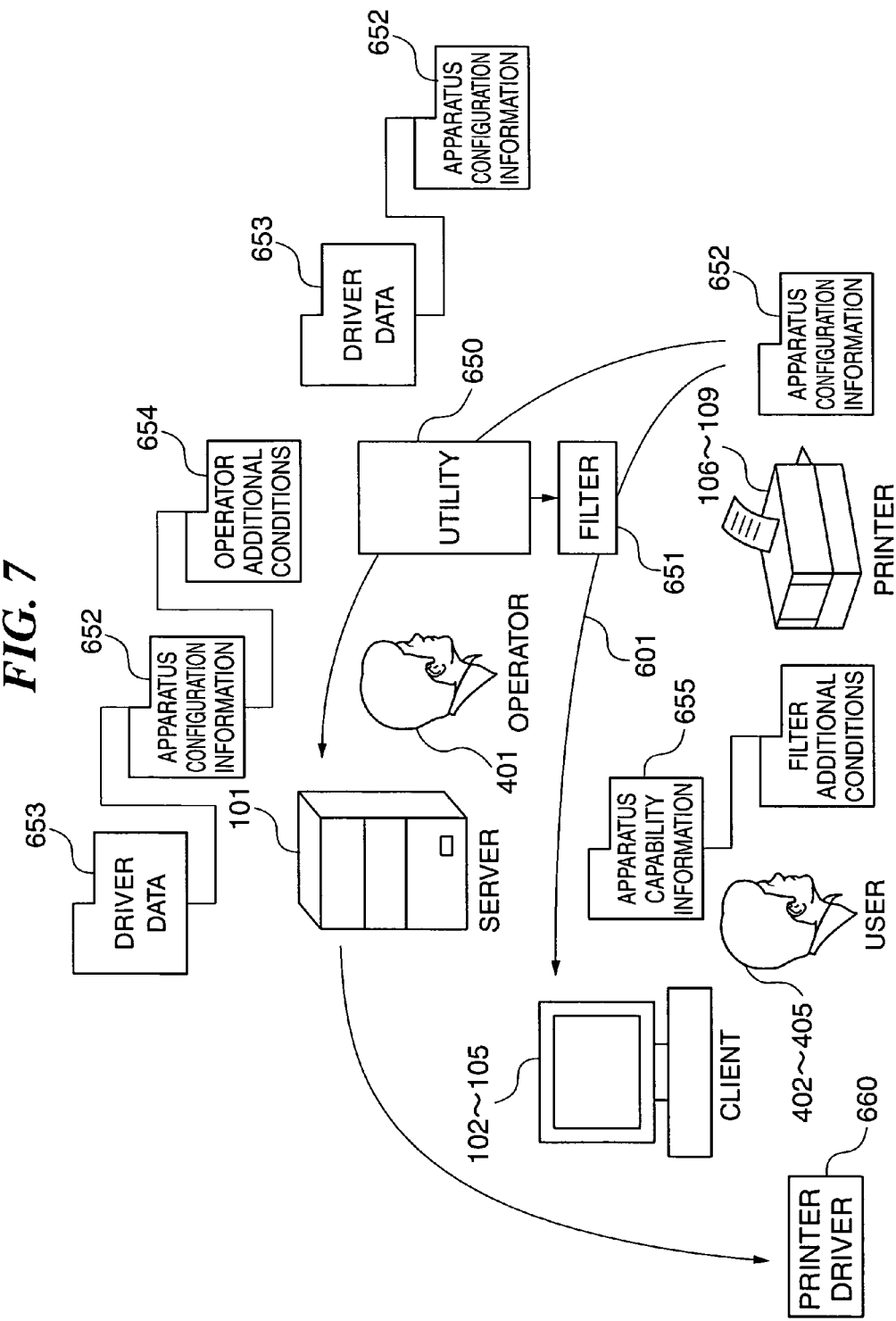
FIG. 7 is a schematic diagram useful in explaining the operation of the system for push installation in FIG. 6.
Figure 8:
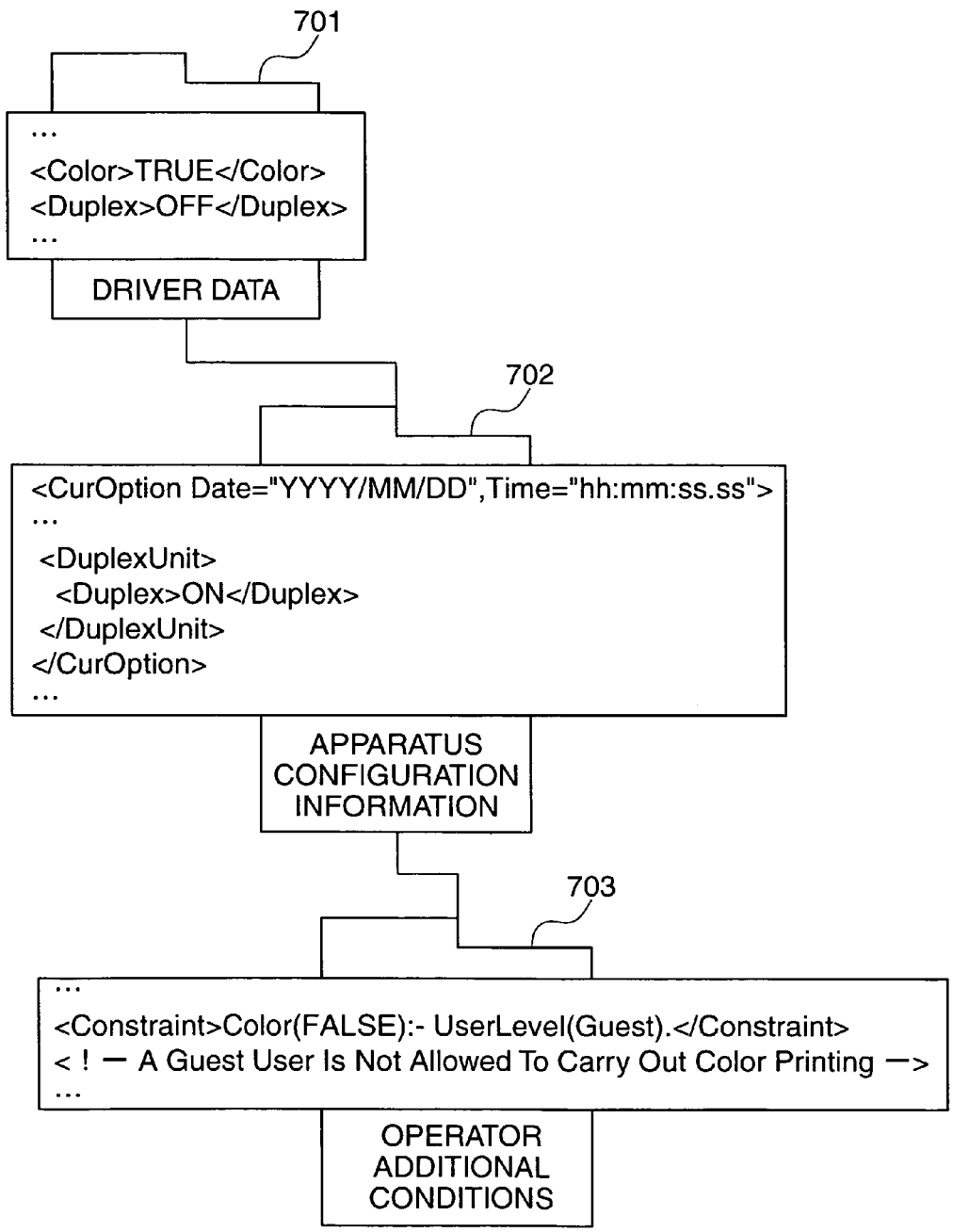
FIG. 8 is a diagram showing examples of driver data, apparatus configuration data, and operator additional conditions appearing in FIG. 7.
Figure 9:
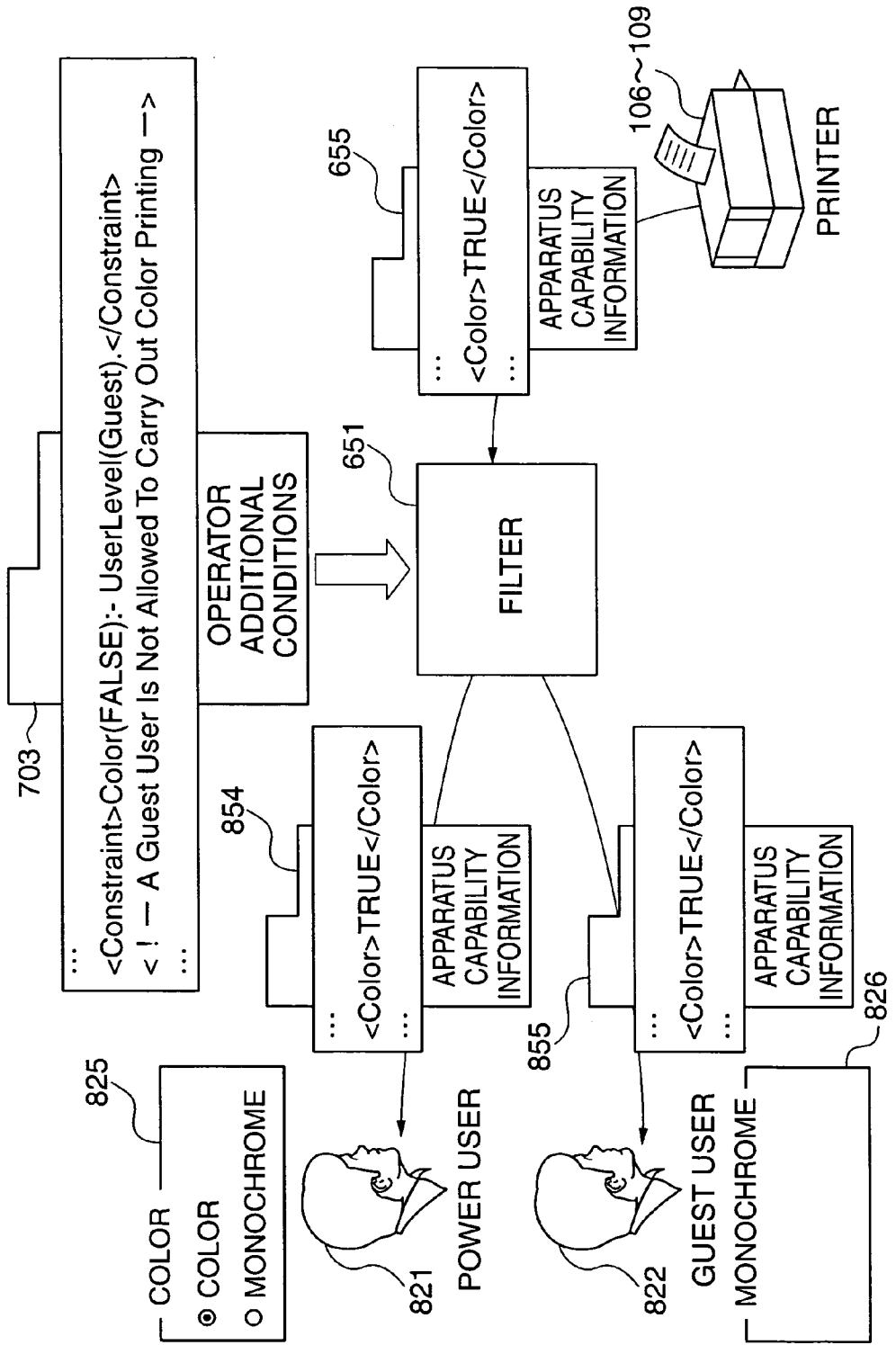
FIG. 9 is a schematic diagram useful in explaining the operation of a filter appearing in FIG. 7.

Next, a description will be given of the push installation of a printer driver in the clients 102 to 105 by the server 101, according to the present embodiment, with reference to FIGS. 5 to 9. FIG. 5 is a diagram showing a memory map of the RAM 2 on the server 101 in FIG. 1; FIG. 6 is a schematic diagram of a system for push installation by the server in FIG. 1; FIG. 7 is a schematic diagram useful in explaining the operation of the system for push installation in FIG. 6; FIG. 8 is a diagram showing examples of driver data, apparatus configuration data, and operator additional conditions; and FIG. 9 is a schematic diagram showing an example of operation of a filter 651 in FIG. 7.

As shown in FIG. 6, in the printing system of the present embodiment, the server 101 is managed by an operator 401 as an administrator of the system, and therefore the server 101 is an administrator apparatus. The clients 102 to 105 are user apparatuses used by a plurality of users 402 to 405, respectively. The printers 106 to 109 are shared printers which can be used by the clients 102 to 105.

In the server 101, printing-related processing programs 304 are loaded into the RAM 2 as shown in FIG. 5. The printing-related processing programs 304 include an installation control program for achieving push installation of printer drivers and changing settings of the clients 102 to 105 concerning the apparatus configuration of the printers 106 to 109. FIG. 5 shows a state where not only the printing-related processing program 304, but also an application 301, related data 303, an OS 305, and a BIOS 306 are loaded on the RAM 2. Further, in FIG. 5, a free area in RAM 2 is shown as a free memory 302.

The installation control program includes an acquisition module for acquiring the apparatus configuration information on each of the printers 106 to 109 from the printer via the LAN 100, a coupling module for coupling the acquired apparatus configuration information on each of the printers 106 to 109 to driver data corresponding to the printer, and an installation module for installing the driver data coupled with the apparatus configuration information on each of the printers 106 to 109 in the clients 102 to 105 via the LAN 100. The driver data corresponding to each of the printers 106 to 109 is stored in the database 110. The apparatus configuration information on each of the printers includes an apparatus name, a generation time of the apparatus configuration information, and option information indicative of presence or absence of one or more optional devices.

Further, the installation control program includes an additional condition setting module for setting additional conditions for limiting the capability of each of the printers by an input operation by the operator (administrator), a filter generating module for generating a filter adapted to the set additional conditions, and a filter installing module for installing the generated filter at a predetermined location in a printer capability informing path on the LAN 100. When having been set, the additional conditions are coupled to the driver data to which the apparatus configuration information on each of the printers has been coupled. The driver data having the set additional conditions and the apparatus configuration information coupled thereto is installed in the clients 102 to 105 via the LAN 100.

More specifically, in the present embodiment, as shown in FIG. 7, the server 101 acquires apparatus configuration information 652 from each of the printers 106 to 109 via the LAN 100. The acquired apparatus configuration information 652 is automatically coupled to driver data 653 corresponding to each of the printers 106 to 109. The driver data 653 is a driver program for forming the printer driver. After the apparatus configuration information 652 has been coupled to the driver data 653, the operator 401 can set the additional conditions 654 using a utility 650. When having been set, the additional conditions 654 are coupled by the utility 650 to the driver data 653 having the apparatus configuration information 652 coupled thereto. The driver data 653 having the apparatus configuration information 652 and the additional conditions 654 thus coupled thereto is bundled into an install set, and then installed in the clients 102 to 105 via the LAN 100 (push installation). In this way, the drivers 660 corresponding to the respective printers 106 to 109 are installed in each of the clients 102 to 105.

Although in the present embodiment, the acquired apparatus configuration information 652 and the driver data 653 are automatically coupled to each other, the apparatus configuration information 652 and the driver data 653 may be coupled using the utility 650. In this case, the acquired apparatus configuration information 652 and the driver data 653 are readably managed, and read out to be coupled to each other.

Further, when the additional conditions 654 are set, a filter 651 adapted to the additional conditions is generated by the utility 650, and installed on an apparatus capability notification paths 601. The apparatus capability notification path 601 connects between the respective clients 102 to 105 and an arbitrary point accessible to the client on the LAN 100. The arbitrary point is provided at a location where the information on the apparatus capability of each of the printer 106 to 109 is held, i.e. a predetermined location within the memory of each of the clients 102 to 105, a predetermined location within the memory of the server 101, or a predetermined location within the memory of another server, for example. The information on the apparatus capability of a printer which is returned to each of the clients 102 to 105 is converted through the filter 651 into information on the apparatus capability adapted to the conditions of the filter 651, followed by being returned to the client. Therefore, the additional conditions 654 referred to by the driver 660 on each of the clients 102 to 105 agree with the apparatus capability information 655 having passed through the associated filter 651.

Examples of the driver data 653, the apparatus configuration information 652, and the additional conditions 654 attached to a driver are shown in FIG. 8. The driver data 653 includes conditions for limiting the driver functions and the device options. In the driver data 701 shown in FIG. 8, for example, capability of color printing (<Color>TRUE</Color>) and nullity of double-sided printing (<Duplex>OFF</Duplex>) are described as default device functions. Double-sided printing is a function enabled when a double-sided unit (double-sided printing mechanism) as an optional device is mounted in a printer, and therefore the effectiveness of double-sided printing is nullified by default. In the apparatus configuration information 702 acquired from the printer, the double-sided printing function is described as effective (<Duplex>ON</Duplex>). That is, the illustrated printer is provided with a double-sided unit, and is capable of performing double-sided printing. When the apparatus configuration information 702 is coupled to the driver data 701, the double-sided printing function becomes effective. The apparatus configuration information 702 also contains a generation time thereof. Therefore, even when a plurality of pieces of apparatus configuration information have been added, the latest apparatus configuration information can be selected from them. Further, as shown in the additional conditions 703, the operator can set a condition that "a guest user is not allowed to carry out color printing", as an additional condition. The effects of this condition will be described hereinafter.

It should be noted that these data are coupled for the purpose of adding conditions for limiting optional devices which are not usually mounted, to thereby limit the functional range of a printer. This causes an increase in the data size, but facilitates later updating of the data. When there is very little probability of updating, it is also-possible to delete entries associated with options for devices which are not mounted, thereby limiting the functional range. This method is advantageous in reducing the data size.

Next, a description will be given of the operation of the filter 651 with reference to FIG. 9.

When the operator 401 sets the additional conditions 703 shown in FIG. 8, i.e. the condition that "a guest user is not allowed to carry out color printing", using the utility 650, the filter 651 for filtering the apparatus capability information that is delivered to an associated node on the LAN 100 is installed at the node, which makes it possible to limit the printing function on a user-by-user basis.

As shown in FIG. 9, for example, when the filter 651 with the condition of "a guest user is not allowed to carry out color printing" added by the operator 401 is installed in a path through which the apparatus capability information 655 of any of the printers 106 to 109, e.g. information indicating that color printing is allowed is transmitted, a power user 821 receives apparatus capability information 854 indicating that color printing is allowed. As a result, a printing setup screen 825 that allows color setting is displayed on the client.

On the other hand, a guest user 822 receives apparatus capability information 855 indicating that color printing is not allowed. As a result, a setup screen 826 for monochrome printing only is displayed on the associated client, which means that the associated printer cannot be used for color printing, but it can be used only for monochrome printing. In other words, no item associated with color printing is displayed on the setup screen 826.

Although in the foregoing, the case where the additional condition of "a guest user is not allowed to carry out color printing" is set has been described by way of example, it is naturally possible to provide a condition associated with a department of a company, for example, and thereby allow the department alone to carry out color printing. Further, if a printer is capable of recognizing each user or the user's authority, it is possible to filter information transmitted by a printer itself to the client used by the user.

Figure 10:
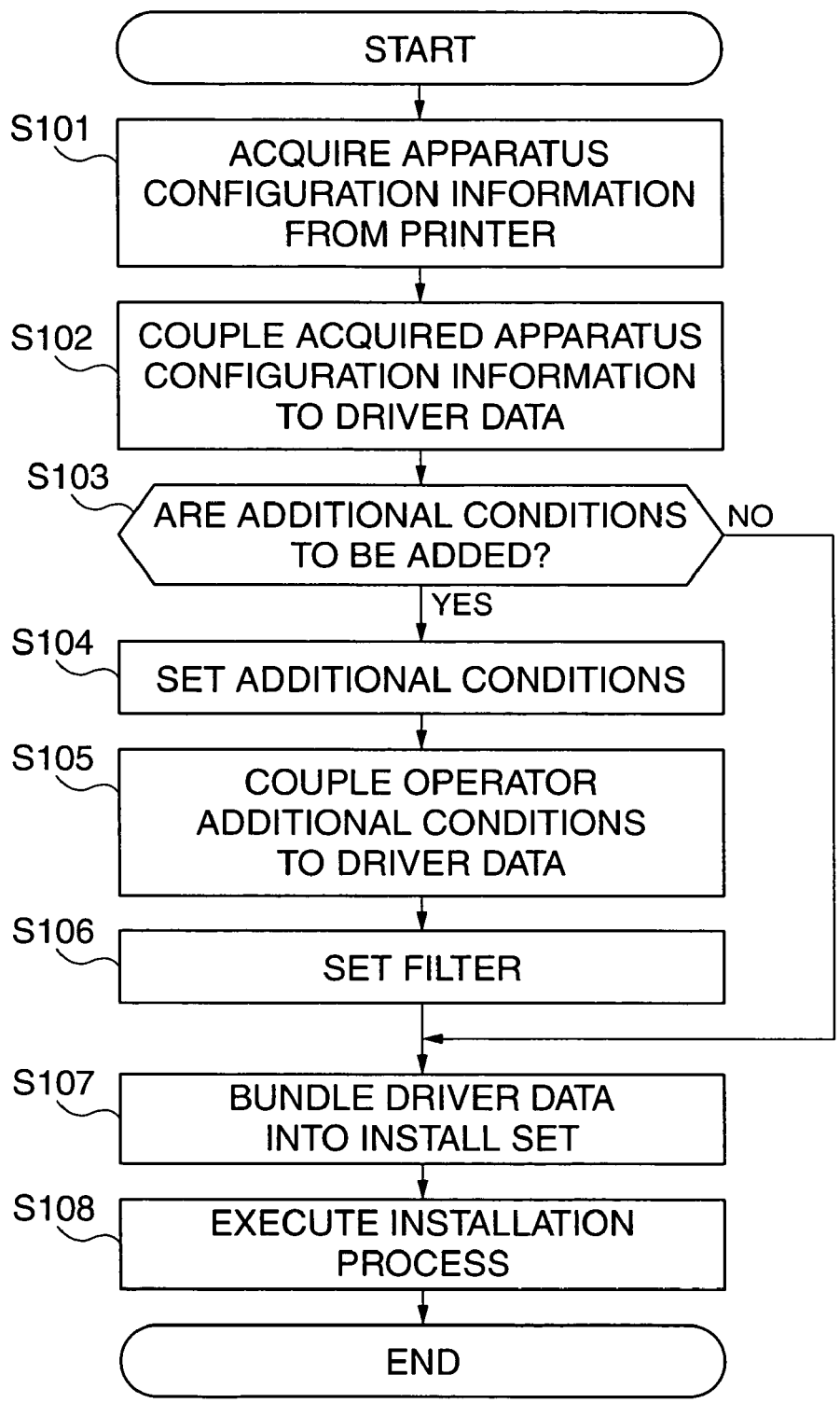
FIG. 10 is a flowchart showing a process executed by the server in FIG. 1 for installation of the printer driver in each client.

Next, a description will be given of an operation carried out by the server 101 for installing a printer driver in the clients 102 to 105, with reference to FIG. 10. FIG. 10 is a flowchart showing a process executed by the server 101 in FIG. 1 for installation of a printer driver in the clients 102 to 105. The process shown in FIG. 10 is executed by the CPU 1 of the server 101 reading the installation control program into the RAM 2 from the external memory 11 and executing the same.

When a printer driver for the printer 106 is installed in the clients 102 to 105 from the server 101, 10 as shown in FIG. 10, first, in a step S101, the CPU 1 of the server 101 acquires the apparatus configuration information 652 from the printer 106 via the LAN 100, and then couples the acquired apparatus configuration information 652 to the driver data 653 in the next step S102. Then, in a step S103, the CPU 1 determines whether or not the operator 401 has selected to add any additional conditions. The selection by the operator 401 as to whether or not to add any additional conditions is carried out on a screen displayed on the display 10 by the utility 650.

If it is determined in the step S103 that addition of additional conditions has been selected, in a step S104, the CPU 1 sets the conditions inputted by the operator 401 on the screen displayed on the display 10 by the utility 650, as the additional conditions 654. Then, in a step S105, the CPU 1 couples the set additional conditions 654 to the driver data 653. Thereafter, in a step S106, the CPI 1 sets the filter 651 configured to the same conditions as the set additional conditions 654 on the apparatus capability notification path 601. Then, the CPU 1 proceeds to a step S107.

If it is determined in the step S103 that addition of additional conditions has not been selected, the CPU 1 skips over the steps S104 to 106 to the step S107.

In the step S107, the CPU 1 bundles either the driver data 653 having the apparatus configuration information 652 and the additional conditions 654 coupled thereto or the driver data 653 having only the apparatus configuration information 652 coupled thereto, into an install set of the printer driver. Then, in a step S108, the CPU 1 performs installation of the printer driver in the clients 102 to 105 using the install set, followed by terminating the present process.

Thus, in each of the clients 102 to 105, an API (Application Programming Interface) of the OS is called, and the installation of the printer driver is carried out.

Figure 11:
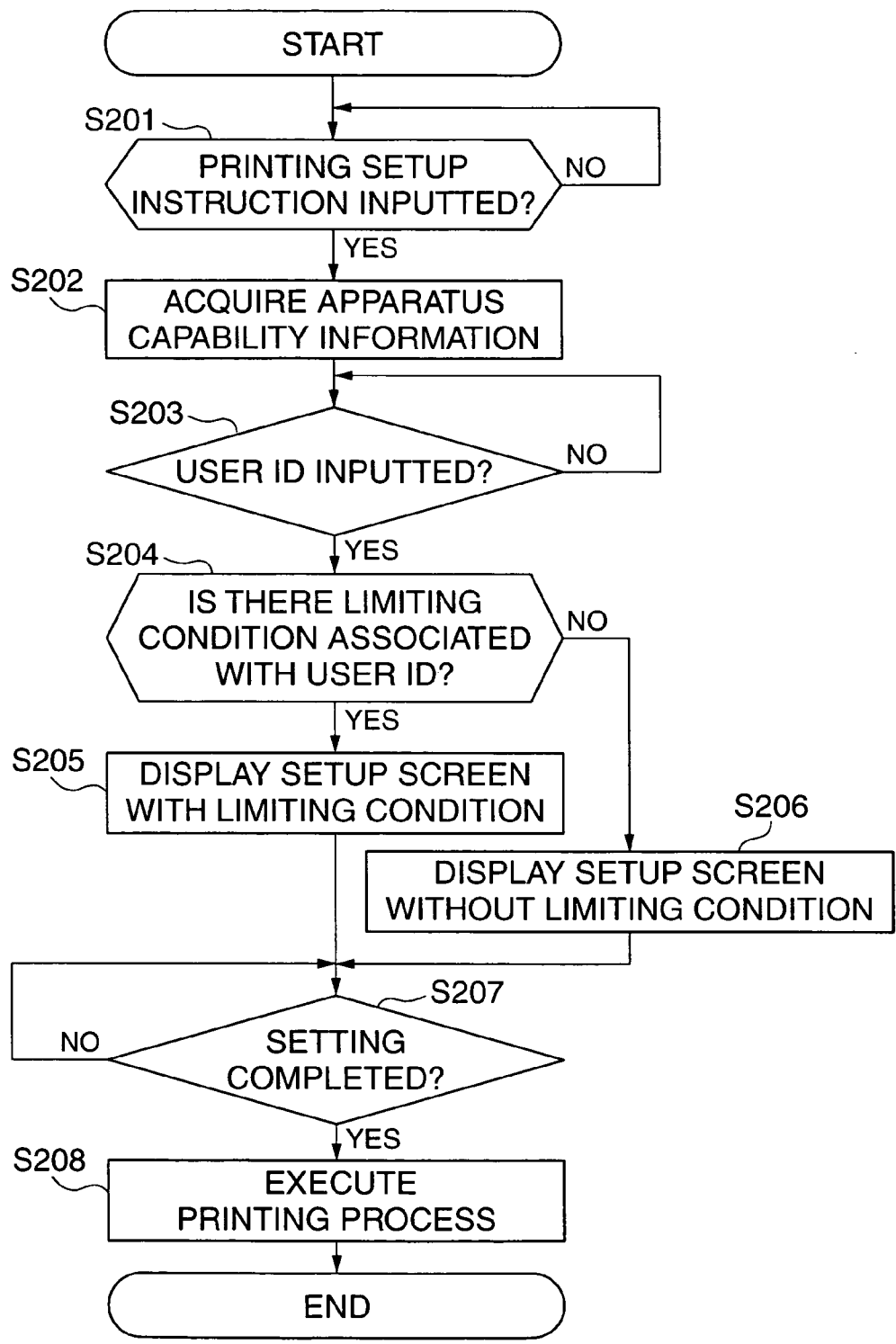
FIG. 11 is a flowchart showing a printing process executed by a client in FIG. 1.

Next, a description will be given of a printing process executed by the clients 102 to 105, with reference to FIG. 11. FIG. 11 is a flowchart showing the printing process executed by one of the clients 102 to 105 in FIG. 1. The process shown in FIG. 11 is carried out by the CPU of the client reading the printer driver from the memory into the RAM and executing the same.

As shown in FIG. 11, first in a step S201, the client awaits input of a printing setup instruction, and then acquires the apparatus capability information 655 in a step S202. The acquisition of the apparatus capability information 655 is performed via the associated apparatus capability notification path 601. If the filter 651 has been set in the path 601, apparatus capability information corresponding to conditions of the filter 651 is acquired. In the present example, it is assumed that the filter 651 is set to a condition limiting the user's authority, e.g. the condition that "a guest user is not allowed to carry out color printing".

Then, in a step S203, the client awaits input of a user ID. When the user ID is inputted, it is determined in a step S204 whether or not any limiting condition associated with the inputted user ID has been set, with reference to the set additional conditions. If a limiting condition associated with the user ID has been set, the client displays a setup screen with a limiting condition displayed thereon (e.g. the screen 826 in FIG. 9) in a step S205. On the other hand, if no limiting condition associated with the user ID has been set, the client displays a setup screen without a limiting condition displayed thereon (e.g. the screen 825 shown in FIG. 9) in a step S206.

Then, in a step S207, the client awaits completion of setup by the user on the setup screen with a limiting condition displayed thereon or the setup screen without a limiting condition displayed thereon. If the setup is completed, the client carries out printing in a step S208, followed by terminating the present process.

As described above, according to the present embodiment, by coupling the apparatus configuration information 652 to the driver data 653, a printer driver having the apparatus configuration information selected therein in advance can be installed in each of the clients 102 to 105 from the server 101 via the LAN 100. As a result, the server 101 (administrator) can change the settings of the clients 102 to 105 concerning the apparatus configuration of the printers 106 to 109, on its (his/her) own initiative. Further, the users 402 to 405 do not have to acquire the apparatus configuration information.

Furthermore, the operator 401 can control apparatus capabilities available to a user according to whether he/she is authorized to use the capabilities by adding conditions on a user-by-user basis and setting the additional conditions as the filter 651 on the apparatus capability notification path 601. Moreover, the setting of the filter 651 make capability of s it possible to prevent variation in capabilities of a printer available to users (clients 102 to 105) from being caused due to respective different information acquisition paths being given to the users.

It is to be understood that the object of the present invention may also be accomplished by supplying a system or an apparatus with a storage medium in which a program code of software, which realizes the functions of the above described embodiment is stored, and causing a computer (or CPU or MPU) of the system or apparatus to read out and execute the program code stored in the storage medium.

In this case, the program code itself read from the storage medium realizes the functions of the above described embodiment, and therefore the program code and the storage medium in which the program code is stored constitute the present invention.

Examples of the storage medium for supplying the program code include a floppy (registered trademark) disk, a hard disk, an optical disk, a magnetic-optical disk, a CD-ROM, a CD-R, a CD-RW, a DVD-ROM, a DVD-RAM, a DVD-RW, a DVD+RW, a magnetic tape, a nonvolatile memory card, and a ROM. Alternatively, the program may be downloaded via a network from another computer, a database, or the like, not shown, connected to the Internet, a commercial network, a local area network, or the like.

Further, it is to be understood that the functions of the above described embodiment may be accomplished not only by executing a program code read out by a computer, but also by causing an OS (operating system) or the like which operates on the computer to perform a part or all of the actual operations based on instructions of the program code.

Further, it is to be understood that the functions of the above described embodiment may be accomplished by writing a program code read out from the storage medium into a memory provided on an expansion board inserted into a computer or in an expansion unit connected to the computer and then causing a CPU or the like provided in the expansion board or the expansion unit to perform a part or all of the actual operations based on instructions of the program code.

What is claimed is:

1. A printing system comprising:
    a server apparatus;
    at least one client apparatus;
    at least one printer available to said at least one client apparatus; and
    a network interconnecting said server apparatus, said at least one client apparatus, and said at least one printer,
    wherein said server apparatus comprises:
    a storage device that stores at least one driver program corresponding to said at least one printer;
    an installation control device that achieves push installation of said at least one printer driver, said installation control device comprising an acquisition device, a management device, a coupling device, and an installation processing device,
    wherein said acquisition device automatically acquires apparatus configuration information on said at least one printer from said at least one printer via said network without user input, wherein said management device manages the acquired apparatus configuration information on said at least one printer such that the driver program corresponding to said at least one printer is associated therewith, wherein said coupling device couples the driver program corresponding to said at least one printer to additional filter conditions, which are used for generating a filter adapted thereto, when capability of said at least one printer is limited by an input operation and the additional filter conditions of one user are different from those of another user, and wherein said installation processing device is responsive to the additional filter conditions, for controlling a process for installing the driver program together with the additional filter conditions on said at least one printer coupled thereto, in said at least one client apparatus without waiting for an installation request to be received from said at least one client apparatus via the network; and a filtering device that generates the filter based on the additional filter conditions when the capability of said at least one printer is limited by the input operation and filters an apparatus capability information for limiting the capability of the at least one printer relating to each of said at least one client apparatus using the additional filter conditions, the apparatus capability information being subjected to different filtering processing for each user of said at least one client apparatus with respect to the at least one printer, wherein the filtering device acquires the apparatus capability information delivered on the network, modifies the apparatus capability information corresponding to a setting provided by the filter, and displays the setting on a graphical user interface of said at least one client apparatus.

2. An information processing apparatus connected, via a network, to at least one client apparatus and at least one printer available to the at least one client apparatus, the information processing apparatus cooperating with the at least one client apparatus and the at least one printer to construct a printing system on the network, the information processing apparatus comprising:

a storage device that stores at least one driver program corresponding to the at least one printer;

an installation control device that achieves push installation of the at least one printer driver, said installation control device comprising an acquisition device, a management device, a coupling device, and an installation processing device, wherein said acquisition device automatically acquires apparatus configuration information on the at least one printer from the at least one printer via the network without user input, wherein said management device manages the acquired apparatus configuration information on the at least one printer such that the driver program corresponding to the at least one printer is associated therewith, wherein said coupling device couples the driver program corresponding to the at least one printer to additional filter conditions, which are used for generating a filter adapted thereto, when capability of the at least one printer is limited by an input operation and the additional filter conditions of one user are different from those of another user, and wherein said installation processing device is responsive to the additional filter conditions, for controlling a process for installing the driver program together with the additional filter conditions on the at least one printer coupled thereto in the at least one client apparatus, without waiting for an installation request to be received from the at least one client apparatus via the network; and a filtering device that generates the filter based on the additional filter conditions when the capability of said at least one printer is limited by the input operation and filters an apparatus capability information for limiting the capability of the at least one printer relating to each of the at least one client apparatus using the additional filter conditions, the apparatus capability information being subjected to different filtering processing for each user of the at least one client apparatus with respect to the at least one printer, wherein the filtering device acquires the apparatus capability information delivered on the network, modifies the apparatus capability information corresponding to a setting provided by the filter, and displays the setting on a graphical user interface of the at least one client apparatus.

3. An information processing apparatus as claimed in claim 2, wherein the apparatus configuration information on the printer includes an apparatus name, a generation time of the apparatus configuration information, and option information indicative of presence or absence of at least one optional device associated with the at least one printer.

4. An information processing apparatus as claimed in claim 2, further comprising:

an additional filter condition-setting device that sets the additional filter conditions for limiting capability of each of the at least one printer by an input operation;

a filter generating device that generates the filter corresponding to the set additional filter conditions;

a filter installing device that installs the generated filter on a printer capability notification path for informing the at least one client apparatus of the capability of the at least one printer; and a second coupling device that couples the additional filter conditions to the driver program corresponding to the at least one printer having the apparatus configuration information on the printer coupled thereto when the additional filter conditions have been set, wherein the driver program corresponding to the at least one printer having the set additional filter conditions and the apparatus configuration information on the at least one printer coupled thereto is installed in the at least one client apparatus by said installation processing device via the network.

5. An information processing apparatus as claimed in claim 4, wherein the additional filter conditions includes a condition for limiting authority of a user who uses the at least one printer.

6. An information processing apparatus as claimed in claim 4, further comprising a second storage device that stores information on the capability of the at least one printer, and wherein the printer capability notification path connects the at least one client apparatus and said second storage device.

7. An information processing apparatus as claimed in claim 2, wherein said management device manages the acquired apparatus configuration information on the at least one printer in a state coupled to the driver program corresponding to the at least one printer.

8. A method of installing in at least one client apparatus, on a network accommodating a server apparatus, the at least one client apparatus, and at least one printer available to the at least one client apparatus, a driver corresponding to each of the at least one printer from the server apparatus, the method comprising:
- an acquisition step of automatically acquiring apparatus configuration information on the at least one printer from the at least one printer via the network without user input;
- a management step of managing the acquired apparatus configuration information on the at least one printer such that the driver program corresponding to the at least one printer is associated therewith;
- a coupling step of coupling the driver program corresponding to the at least one printer to additional filter conditions, which are used for generating a filter adapted thereto, when capability of the at least one printer is limited by an input operation and the additional filter conditions of one users are different from that of another user;
- an installation processing step of controlling a process for installing the driver program together with the additional filter conditions on the at least one printer coupled thereto, in the at least one client apparatus, in response to the additional filter conditions, without waiting for an installation request to be received from the at least one client apparatus via the network; and
- a filtering step of generating the filter based on the additional filter conditions when the capability of the at least one printer is limited by the input operation and filtering an apparatus capability information for limiting the capability of the at least one printer relating to each of the at least one client apparatus using the additional filter conditions, the apparatus capability information being subjected to different filtering processing for each user of the at least one client apparatus with respect to the at least one printer,
- wherein the filtering step acquires the apparatus capability information delivered on the network, modifies the apparatus capability information corresponding to a setting provided by the filter, and displays the setting on a graphical user interface of the at least one client apparatus.

9. An method as claimed in claim 8, wherein the apparatus configuration information on the at least one printer includes an apparatus name, a generation time of the apparatus configuration information, and option information indicative of presence or absence of at least one optional device associated with the at least one printer.

10. A method as claimed in claim 8, further comprising:
- an additional filter condition-setting step of setting the additional filter conditions for limiting capability of each of the at least one printer by an input operation;
- a filter generating step of generating the filter corresponding to the set additional filter conditions;
- a filter installing step of installing the generated filter on printer capability notification paths for informing the at least one client apparatus of the capability of the at least one printer; and
- a second coupling step of coupling the additional filter conditions to the driver program corresponding to the at least one printer having the apparatus configuration information on the at least one printer coupled thereto when the additional filter conditions have been set,
- wherein the driver program corresponding to the at least one printer having the set additional filter conditions and the apparatus configuration information on the at least one printer coupled thereto is installed in the at least one client apparatus in said installation processing step via the network.

11. A method as claimed in claim 10, wherein the additional filter conditions include a condition for limiting authority of a user who uses the at least one printer.

12. A method as claimed in claim 10, wherein the server apparatus includes a second storage device that stores information on the capability of the at least one printer, and wherein the printer capability notification path connects the at least one client apparatus and the second storage device.

13. A method as claimed in claim 8, wherein in said management step, the acquired apparatus configuration information on the at least one printer is managed in a state coupled to the driver program corresponding to the at least one printer.

14. A computer-readable medium storing a computer program for installing in at least one client apparatus, on a network accommodating a server apparatus, the at least one client apparatus, and at least one printer available to the at least one client apparatus, a driver corresponding to each of the at least one printer from the server apparatus, the computer program comprising:
- an acquisition module for automatically acquiring apparatus configuration information on the at least one printer from the at least one printer via the network without user input;
- a management module for managing the acquired apparatus configuration information on the at least one printer such that the driver program corresponding to the printer is associated therewith;
- a coupling module coupling the driver program corresponding to the at least one printer to additional filter conditions, which are used for generating a filter adapted thereto, when capability of the at least one printer is limited by an input operation and the additional filter conditions of one user are different from those of another user;
- an installation processing module for controlling a process for installing the driver program together with the additional filter conditions on the at least one printer coupled thereto, in the at least one client apparatus, in response to the additional filter conditions, without waiting for an installation request to be received from the at least one client apparatus via the network; and
- a filtering module for generating the filter based on the additional filter conditions when the capability of the at least one printer is limited by the input operation and filtering an apparatus capability information for limiting the capability of the at least one printer relating to each of the at least one client apparatus using the additional filter conditions, the apparatus capability information being subjected to different filtering processing for each user of the at least one client apparatus with respect to the at least one printer,
- wherein the filtering module acquires the apparatus capability information delivered on the network, modifies the apparatus capability information corresponding to a setting provided by the filter, and displays the setting on a graphical user interface of the at least one client apparatus.

* * * * *